(12) United States Patent
One et al.

(10) Patent No.: US 11,318,551 B2
(45) Date of Patent: May 3, 2022

(54) ARC WELDING DISPLAY DEVICE AND DISPLAY METHOD

(71) Applicant: KOBE STEEL, LTD., Hyogo (JP)

(72) Inventors: Tsutomu One, Hyogo (JP); Yoshiharu Nishida, Hyogo (JP); Atsushi Fukunaga, Kanagawa (JP)

(73) Assignee: Kobe Steel, Ltd., Hyogo (JP)

( * ) Notice: Subject to any disclaimer, the term of this patent is extended or adjusted under 35 U.S.C. 154(b) by 527 days.

(21) Appl. No.: 16/348,233

(22) PCT Filed: Nov. 6, 2017

(86) PCT No.: PCT/JP2017/039986
§ 371 (c)(1),
(2) Date: May 8, 2019

(87) PCT Pub. No.: WO2018/088372
PCT Pub. Date: May 17, 2018

(65) Prior Publication Data
US 2019/0270158 A1    Sep. 5, 2019

(30) Foreign Application Priority Data

Nov. 11, 2016   (JP) .............................. JP2016-220666

(51) Int. Cl.
*B23K 9/095* (2006.01)
*B23K 9/12* (2006.01)
*B23K 31/00* (2006.01)

(52) U.S. Cl.
CPC ............ *B23K 9/0956* (2013.01); *B23K 9/095* (2013.01); *B23K 9/12* (2013.01); *B23K 9/126* (2013.01); *B23K 31/003* (2013.01)

(58) Field of Classification Search
CPC .... B23K 31/003; B23K 9/0216; B23K 9/095; B23K 9/0956; B23K 9/12; B23K 9/126; B23K 9/127
(Continued)

(56) References Cited

U.S. PATENT DOCUMENTS

| 4,417,126 A | 11/1983 | Kasahara et al. |
| 4,556,777 A * | 12/1985 | Sarugaku ............... B23K 9/127 219/124.34 |

(Continued)

FOREIGN PATENT DOCUMENTS

| EP | 1027951 A1 | 8/2000 |
| JP | S58-053375 A | 3/1983 |

(Continued)

OTHER PUBLICATIONS

International Search Report issued in PCT/JP2017/039986; dated Dec. 5, 2017.

(Continued)

*Primary Examiner* — Michael A Laflame, Jr.
*Assistant Examiner* — Ket D Dang
(74) *Attorney, Agent, or Firm* — Studebaker & Brackett PC (57) ABSTRACT

An arc welding display device is included in a welding apparatus having a weaving function of swinging a torch with respect to a welding direction. The arc welding display device displays, on a screen, at least one of a welding current and a welding voltage during the arc welding with a range sectioned by each fixed period including at least one weaving period.

10 Claims, 5 Drawing Sheets

(58) Field of Classification Search
USPC .......................... 219/124.34, 124.22, 125.12, 219/130.01–130.33, 136, 137 R, 137 PS, 219/125.1, 126
See application file for complete search history.

(56) References Cited

U.S. PATENT DOCUMENTS

| | | |
|---|---|---|
| 6,271,500 B1 | 8/2001 | Hirayama et al. |
| 2004/0074885 A1* | 4/2004 | Takatani ................ B23K 9/126 219/130.5 |
| 2016/0001389 A1* | 1/2016 | Kim ..................... B23K 9/0206 219/125.12 |

FOREIGN PATENT DOCUMENTS

| | | |
|---|---|---|
| JP | S63-224870 A | 9/1988 |
| JP | H05-329645 A | 12/1993 |
| JP | H09-253857 A | 9/1997 |
| JP | H09-262670 A | 10/1997 |
| JP | H11-058007 A | 3/1999 |
| JP | 2010-120042 A | 6/2010 |
| JP | 2015-013313 A | 1/2015 |

OTHER PUBLICATIONS

Written Opinion issued in PCT/JP2017/039986; dated Dec. 5, 2017.
The extended European search report issued by the European Patent Office on Jun. 18, 2020, which corresponds to European Patent Application No. 17869053.3-1002 and is related to U.S. Appl. No. 16/348,233.

* cited by examiner

ARC WELDING DISPLAY DEVICE AND DISPLAY METHOD

TECHNICAL FIELD

The present invention relates to an arc welding technique using, for example, an automatic welding apparatus or a welding robot, and particularly relates to a display technique capable of visualizing a tracking state in arc-tracking welding.

BACKGROUND ART

In arc welding, "arc-tracking" is used commonly in which a deviation of a wire tip position from a joining position of welding is detected on the basis of a variation such as a welding current or a welding voltage and a welding line is followed automatically by correcting for the detected deviation. The arc-tracking is intended to prevent occurrence of welding defects and increase the ratio of automation by detecting and correcting for a deviation of the target position of a working tool (welding torch) due to a target work setting error, a working error, deformation during working, etc.

The above principle of arc-tracking utilizes the fact that the welding current or welding voltage varies according to a variation of the projection length of a welding wire (more correctly, a distance L from a torch power supply position to a base material). A deviation of the torch target position is detected on the basis of asymmetry of an arc current waveform or an arc voltage waveform during a weaving operation. The detected deviation is fed back to an automatic welding apparatus or a welding robot system and a correction is made in such a direction that the deviation of the torch tip position is canceled out. A welding line is automatically followed in this manner.

It has been known that the following problem occurs in the aforementioned arc-tracking.

For example, in actual welding, a robot operation locus (tracking locus) during the welding may vary in accordance with welding conditions (current, voltage, welding rate, weaving width, and weaving frequency) and tracking parameters (gain, and offset of difference between left and right currents). It is therefore necessary for a worker to perform welding after teaching the robot and further confirm arc-tracking after the welding.

Figure 1:
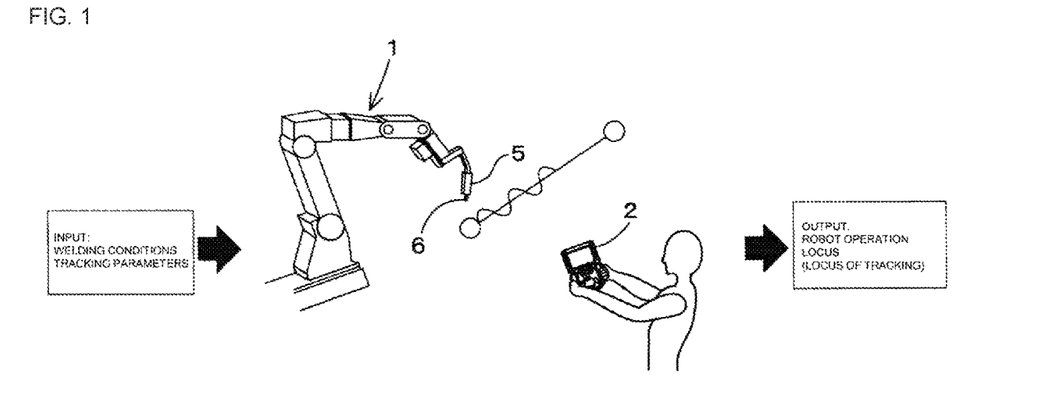
FIG. 1 is a view schematically showing a state in which arc-tracking welding is performed.

On this occasion, as shown in FIG. 1, the worker sets the welding conditions and the tracking parameters as input conditions to thereby acquire an operation locus (corrected operation locus subjected to tracking control) of the robot as an output. To say in other words, the worker confirms the tracking without observing information such as a welding current waveform during the welding.

Therefore, even if the worker judges the tracking to be not successful after confirming the operation locus of the robot and the like, the worker cannot clearly grasp why the arc-tracking has deviated. The worker always adjusts the welding conditions and the tracking parameters to obtain a desired locus through repeated trial and error depending on his/her own experience and intuition. Specifically when the arc-tracking is not successful, there occurs a deviation of the welding locus, meandering of the welding line or a defect of the welding, causing occurrence of a defective product.

As described above, the worker confirms the arc-tracking not by observing the welding current waveform during the welding but by observing only the operation locus of the robot as a result thereof. Even if the worker wants to observe the welding current waveform during the welding in order to reduce failure in arc-tracking, the worker cannot visually and easily grasp the relation to the deviation from the current waveform displayed simply on a screen (that is, the waveform caused by weaving).

The following Patent Documents 1 to 4 disclose techniques intended to solve such a problem that may occur during arc-tracking welding.

For example, Patent Document 1 discloses an arc sensor monitoring apparatus in a welding robot system using an arc sensor for correcting a position of a welding torch by use of a variation of a welding phenomenon, the arc sensor monitoring apparatus including: a unit that inputs position correction information for correcting the position of the welding torch between a welding torch chip and a base material, that is, vertical correction information, and position correction information for correcting a position of each oscillation end portion of the welding torch chip, that is, lateral correction information, the vertical correction information and the lateral correction information being outputted from an arc sensor circuit; and an output unit that graphically displays degrees of values of the vertical correction information and the lateral correction information in real time in accordance with the vertical correction information and the lateral correction information respectively.

Patent Document 2 discloses a consumable electrode type arc welding method in consumable electrode type arc welding for performing welding tracking a welding line while weaving a welding torch in a left-right direction, including the steps of detecting a current value at a weaving left end portion in a rightward weaving period when the welding torch is weaved from left to right, and then detecting a welding current minimum value in the rightward weaving period; detecting a current value at a weaving right end portion in a leftward weaving period when the welding torch is weaved from right to left, and then detecting a welding current minimum value in the leftward weaving period; then comparing a differential current value between the current values detected in the rightward weaving period and a differential current value between the current values detected in the leftward weaving period by arithmetic operation on the two differential current values; and controlling movement of a weaving width center position of the welding torch in accordance with a deviation between the two differential current values.

Patent Document 3 discloses a method for setting tracking parameters of an arc sensor for a robot, including: a moving step of moving, in moving a welding torch along a teaching line that is divided into plural sections having different shifts while causing the welding torch to perform welding, the welding torch by shifting the welding torch according to the shifts that are determined for the respective sections; an averaging step of averaging amounts of electricity that are supplied to the moving welding torch and sampled for the respective sections in each prescribed period that is longer than a period of the sampling (hereinafter referred to as sampling period); a difference calculating step of calculating differences between averages and a reference value; an average difference calculating step of calculating an average difference of the differences of the respective sections; a regression line and correlation coefficient acquiring step of determining, on the basis of the average difference of the differences of the respective sections, a regression line and a correlation coefficient between the regression line and the average difference; and an evaluating step of evaluating parameters on tracking relating to a gradient and an intercept of the regression line on the basis of the correlation coefficient and setting the parameters as tracking parameters.

Patent Document 4 discloses an arc welding display device of a robot control apparatus for arc welding, including: a welding electric signal detection unit that detects at least one of a welding current and a welding voltage; a data storage unit that stores the detected welding electric signal; an operation locus storage unit that stores an operation locus of a robot; a display unit that displays, on a display, at least one of the welding current and the welding voltage detected by the welding electric signal detection unit, and the operation locus of the robot stored in the operation locus storage unit; and a display range setting unit that sets a display range of the display unit.

BACKGROUND ART DOCUMENTS

Patent Documents

Patent Document 1: JP-A-H5-329645
Patent Document 2: JP-A-S58-53375
Patent Document 3: JP-A-2010-120042
Patent Document 4: JP-A-H11-58007

SUMMARY OF THE INVENTION

Problem that the Invention is to Solve

The aforementioned Patent Documents 1 to 4 disclose various techniques. However, the techniques are insufficient to solve the problem intended by the present application.

For example, according to the arc sensor monitoring apparatus and directions of the same disclosed in Patent Document 1, a locus of tracking is displayed on a pendant to monitor correction information of a torch position. Although a worker can monitor a correction result due to the technique of Patent Document 1, the worker cannot know, in an easily recognizable manner, information during welding such as what kind of current is flowing. Thus, desired arc-tracking cannot be attained.

According to the consumable electrode type arc welding method disclosed in Patent Document 2, a center position of weaving can correctly track a welding line on the basis of maximum current values and minimum current values at right and left ends during the weaving, in fact, in spite of use of the technique, the locus of the center position of the weaving after the tracking control varies to cause meandering or the like in accordance with a groove shape, welding conditions, weaving conditions, and a control gain of tracking. It is therefore necessary for a worker to adjust various conditions or parameters. Thus, it is considered that it is difficult to attain desired arc-tracking.

The method for setting tracking parameters of an arc sensor for a robot and an apparatus for setting tracking parameters of an arc sensor for a robot disclosed in Patent Document 3 disclose a technique for adjusting parameters of tracking automatically. In spite of use of the technique, it is necessary to perform another series of sequences for the automatic adjustment when welding conditions or weaving conditions are changed, for example, from the viewpoint of a welding procedure. In addition, welding at a position shifted from a place to be welded has to be performed in a work close to an actual one. Thus, the work is wasted. Practically, a worker adjusts welding conditions and weaving parameters simultaneously in real time while observing welding performed by the robot, so that desired welding quality and tracking accuracy can be secured, Thus, the use of the technique of Patent Document 3 deteriorates the efficiency.

The arc welding display device disclosed in Patent Document 4 includes a display unit that displays an operation locus of a robot and a welding current waveform, and a display range setting unit that sets a display range, so that a specified range in the operation locus of the robot can be displayed. In spite of use of the technique, it is considered that how to determine the range to be set is not known when the technique is applied to adjustment of tracking of weaving, and granularity in the display is too wide, that is, it is difficult to specify an appropriate range. In addition, it is difficult to change the settings in real time while confirming the welding.

The present invention has been developed in consideration of the aforementioned problems. An object of the invention is to provide a display technique of arc welding by which a worker who performs arc-tracking welding can confirm information during the welding and can perform the arc-tracking welding accurately on the basis of the confirmed information.

Means for Solving the Problem

In order to attain the foregoing object, an arc welding display device according to the invention is provided with the following technical means.

That is, the arc welding display device according to the invention has a mode as an arc welding display device included in a welding apparatus having a weaving function of swinging a torch with respect to a welding direction, which displays, on a screen, at least one of a welding current and a welding voltage during the arc welding with a range sectioned by each fixed period including at least one weaving period.

Preferably, an average welding current in each fixed period including at least one weaving period is subtracted from the welding current during the arc welding or an average welding voltage in each fixed period including at least one weaving period is subtracted from the welding voltage during the arc welding, and a value acquired by the subtraction is displayed on the screen.

Preferably, as for the welding current or the welding voltage during the arc welding, waveforms in several periods which are superimposed on one another, each of which is a waveform sectioned by each fixed period including at least one weaving period, are displayed on the screen.

Preferably, as for the welding current or the welding voltage during the arc welding, an indication indicating a position corresponding to a left end or a right end of a weaving operation is displayed on the screen.

Preferably, information required for the arc welding is displayed on the screen.

In addition, an arc welding display method according to the invention has a mode as an arc welding display method for displaying a state of arc welding in a welding apparatus having a weaving function of swinging a torch with respect to a welding direction, the method including displaying at least one of a welding current and a welding voltage during the arc welding with a range sectioned by each fixed period including at least one weaving period.

Preferably, an average welding current in each fixed period including at least one weaving period is subtracted from the welding current during the arc welding or an average welding voltage in each fixed period including at least one weaving period is subtracted from the welding voltage during the arc welding, and a value acquired by the subtraction is displayed.

Preferably, as for the welding current or the welding voltage during the arc welding, waveforms in several periods which are superimposed on one another, each of which is a waveform sectioned by each fixed period including at least one weaving period, are displayed.

Preferably, as for the welding current or the welding voltage during the arc welding, an indication indicating a position corresponding to a left end or a right end of a weaving operation is displayed.

Preferably, information required for the arc welding is displayed.

Advantage of the Invention

By use of the arc welding display technique according to the invention, a worker who performs arc-tracking welding can confirm information during the welding, and can perform the arc-tracking welding accurately on the basis of the confirmed information.

MODE FOR CARRYING OUT THE INVENTION

An arc welding display device and an arc welding display method according to an embodiment of the present invention is hereinafter described in detail with reference to the drawings.

Although the following description is directed to a case where an apparatus that performs a welding operation is an articulated welding robot that causes a welding torch to perform a swinging operation (weaving operation), this is just an example and the apparatus that performs a welding operation may be a dedicated automatic welding apparatus.

Figure 5A:
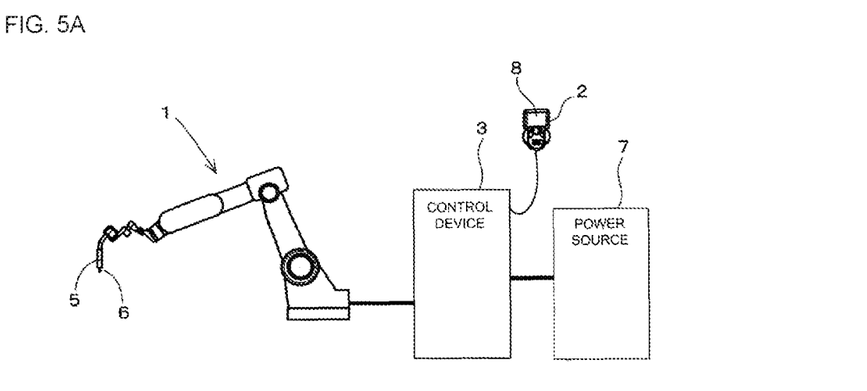
FIG. 5A is a diagram showing a configuration of a welding system.

The display device and the display method according to the embodiment is, for example, applied to a vertical articulated robot system as shown in FIG. 5A. The vertical articulated robot system is outlined below.

For example, the vertical articulated robot system includes a welding robot 1, a control device 3 that is equipped with a teaching pendant 2, and a personal computer. As shown in FIG. 5A, the welding robot 1 is a vertical articulated 6-axis industrial robot and is equipped with, at a tip thereof, a welding tool including a welding torch 5 etc. The welding robot 1 may be mounted on a slider for moving the welding robot 1 itself.

The control device 3 controls the welding robot 1 according to a program about which the control device 3 has been taught in advance. The program is prepared using the teaching pendant 2 connected to the control device 3 or prepared using an offline teaching system utilizing the personal computer. In either case, the program is prepared in advance of an actual operation. The program prepared by the personal computer is delivered to the control device 3 via a storage medium or the like or transmitted to the control device 3 by data communication.

The personal computer, that is, the offline teaching system is equipped with a display that can display graphics, and a keyboard or a mouse as an input device. In addition, the personal computer is provided with a storage device or a communication device in order to import CAD information of a work.

The display method according to the embodiment is implemented in a form of a program provided in the control device 3.

The display device and the display method according to the embodiment is described below in detail.

Figure 5B:
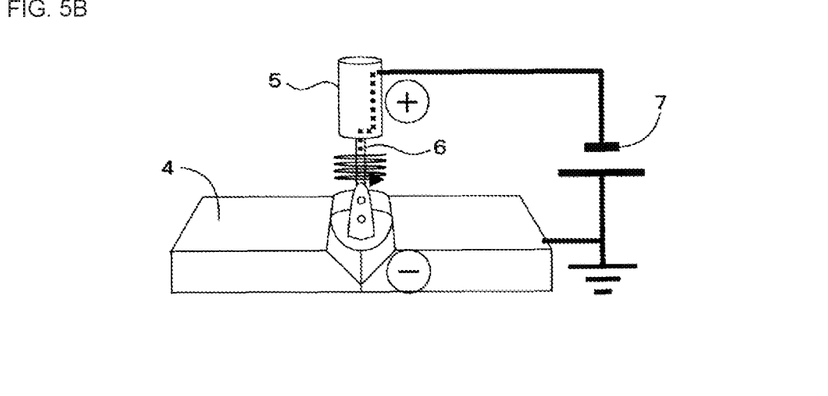
FIG. 5B is a diagram showing the configuration of the welding system (torch portion).

FIG. 5B is a schematic diagram showing arc welding.

In the arc welding, a voltage is applied between a base material 4 (work) and a welding wire 6 (consumable electrode) supplied from the welding torch 5, so as to generate an arc between the welding wire 6 and the base material 4. The welding is performed while the base material 4 and the welding wire 6 are melted by arc heat of the arc. Since the welding wire 6 melts down as the arc welding is performed, during the welding the welding wire 6 is continuously supplied from a supply device through the inside of the welding torch 5.

Welding metal produced from a molten portion of the base material 4 and the welding wire 6 solidifies to form a welding bead, whereby strong welding is attained, in welding between medium-thickness plates as typified by welding between thick steel plates, to obtain necessary strength of a welded portion, it is necessary to set the width of a welding bead large enough to secure a necessary amount of deposited metal and penetration depth. To this end, the welding between the medium-thickness plates is performed while an operation called weaving is performed in which the welding torch 5 is swung in the left-right direction. Thus, the width of the welding bead is increased to secure the necessary welding strength.

The welding torch 5 also supplies a shield gas, whereby the arc is protected from the air. Molten metal is also protected from the air by virtue of the presence of gas that is generated by decomposition of flux contained in the welding wire 6, whereby formation of welding defects such as a blow hole is suppressed.

In the field of welding with medium-thickness plates, it is not always the case where a welding line where welding should be performed is located at a determined position due to any of various reasons that, for example, the processing accuracy of a work to be welded is low, the setting accuracy of the work to be welded is low, and the work to be welded is deformed due to thermal strain during the welding. Deviation from the welding line is approximately on the order of several millimeters to centimeters.

However, from the viewpoint of welding quality, in general, the allowable deviation from the welding line in the arc welding robot 1 in the field of thick plates is smaller than 1 mm, Playback-type robots that perform welding at predetermined positions cannot attain such a level of welding quality. That is, in the welding robot 1 for medium-thickness plates, it is an essential condition to detect a deviation between a pre-taught welding position and a welding position of an actual work in real time and to perform "tracking" along a welding line on the sub-millimeter order so as to adapt to every detected deviation. This is one of indispensable and very important functions.

In order to carry out the display device and the display method for the aforementioned arc welding, a display device 8 which can display and monitor the state of the arc welding is included in the embodiment as shown in FIG. 5A. A display screen of the teaching pendant 2 is used as the display device 8 in the embodiment. However, the personal computer constituting the offline teaching system may be used as the display device 8.

In the display device 8 according to the embodiment, the following pieces of information are displayed on the screen, and presented to a worker.

(i) The display device 8 displays a welding current or a welding voltage during arc-tracking welding. At least one of the welding current and the welding voltage is displayed on the screen and presented to the worker (welding operator) with a range to be displayed, which is sectioned by each fixed period including at least one weaving period. Preferably, the range to be displayed on the screen may be sectioned by each fixed period so as to include one weaving period from a time point where the welding torch 5 reaches one end to a time point where the welding torch 5 reaches the one end again.

Typical MIG or MAG arc welding is performed using a constant-voltage power source. Therefore, a deviation from the center of a welding line appears in a current. On the other hand, TIG welding is performed using a constant-current power source. Therefore, a deviation from the center of a welding line appears in a voltage. Accordingly, the display device 8 displays at least one or both of the welding current and the welding voltage during arc-tracking welding.

When the welding current and/or the welding voltage is displayed on the display device 8 with a range sectioned by each fixed period, it is possible to observe a current waveform or a voltage waveform with an appropriate range (time width) necessary and sufficient for arc-tracking.

When the display is updated in every weaving, a current waveform or a voltage waveform in each weaving period can be observed. Thus, it is possible to accurately know a state of welding which is being performed.

(ii) In the displayed device 8, an average welding current in each fixed period including at least one weaving period or an average welding voltage in each fixed period including at least one weaving period is subtracted from the welding current or the welding voltage during the arc welding, and a value acquired by the subtraction is displayed.

As a result, a vertical offset of the current waveform or the voltage waveform caused by fluctuation of a vertical position of the welding torch 5 can be eliminated. Thus, the worker can observe the left-right current balance closely and simply. It is desired that a vertical (torch direction) deviation is eliminated by vertical tracking. The vertical tracking is generally controlled in accordance with whether the average current observed simply is larger or smaller than a reference. Therefore, the worker does not have to take care of the vertical tracking.

(iii) When the aforementioned information (ii) is displayed, a waveform sectioned by each fixed period including at least one weaving period may be displayed so that waveforms in several periods are superimposed on one another in the display device 8, if necessary.

When current waveforms or voltage waveforms in several periods are superimposed on one another in this manner, the current waveform in weaving this time can be confirmed after a certain time (several periods of weaving), and on the contrary it can also confirmed whether the current waveform or the voltage waveform has been changed or not in comparison with the current waveform or the voltage waveform acquired several periods ago.

In addition, in the superimposed display, the waveforms in several weaving periods can be observed simultaneously. Therefore, the worker can observe the waveforms accurately without being affected by low-frequency noise in each weaving period or an instantaneous current change caused by an arc phenomenon. In addition, when abnormal current waveforms are observed continuously, the worker can find failure in arc-tracking or wrong setting of welding conditions.

In the background art, the current waveform is not observed with a time width divided appropriately. It is therefore considered that the worker cannot find that the waveform is abnormal. Arc-tracking is typically performed on the basis of about two or four samples of left-right current differences. It is therefore considered that tracking is successful by accident due to a short welding section or the like in spite of an abnormal waveform. However, it is considered that tracking is failed in welding on a new work having the same shape. According to the technique of the embodiment, such a problem can be avoided.

(iv) A mark indicating a left end or a right end (one end or the other end) of a weaving operation can be also displayed in the display device 8. In addition, numerical values used for control of tracking or auxiliary information can be displayed on the screen as information required for the arc-tracking welding. Examples of the information to be displayed may include a difference between left and right currents, an average current, a difference between left and right voltages, an average voltage of the left and right voltages, etc.

Due to the left or right mark, the worker can quickly know on which side of weaving the current is higher. In addition, since information required for the arc-tracking welding (numerical values used for control of tracking or auxiliary information) can be recognized on the display device 8, the worker can perform the welding operation properly with reference to the information.

As described above, when the arc welding display device and the arc welding display method according to the invention are used, the worker who performs arc-tracking welding can observe the screen displayed on the display device 8 and perform working efficiently to determine welding conditions and tracking parameters. Thus, the arc-tracking welding can be performed accurately even in an actual welding site while the working time or the number of trials can be reduced.

As described previously, the display of the current waveform or the like is not limited to the teaching pendant 2. Data may be transferred to the personal computer or the display device 8 in real time, and displayed on a device in the transfer destination. Data may be stored in a welding power source 7 or a controller so that the stored data can be transferred to the personal computer or the like and displayed on a display monitor of the personal computer.

When the aforementioned waveforms (i) to (iv) are displayed, the welding current or the welding voltage contains a plenty of high frequency noise. It is preferable to apply a low pass filter such as an analog filter or an FIR filter to the welding current or the welding voltage so as to display a processed waveform.

There is a temporal difference between a current value or a voltage value fed back from the welding power source 7 and a timing when the weaving of the welding robot 1 reaches the left end or the right end. There occurs a slight time lag due to communication, a control period, or the like, for example, until each motor reaches a position corresponding to the weaving left end after the welding robot 1 issues an instruction of the position corresponding to the weaving left end.

Further, there occurs a communication delay time until the control device 3 recognizes a current or voltage value fed back from the welding power source 7 after the welding power source 7 recognizes a current or voltage with which welding is performed at the left end position of weaving, and transmits the recognized current or voltage to be ted back to the control device 3. When the low pass filter is applied to the recognized value in the control device 3, there occurs a delay time corresponding to the filter.

In normal arc-tracking, these delay times are calculated in advance by experiments so that a temporal difference can be adjusted. Specifically, a difference between the timing when the left or right end is instructed and the timing when the current waveform or the voltage waveform has a peak corresponds to the temporal difference. Therefore, it will go well if time is measured simply.

That is, the temporal difference between the recognition of the left or right end based on an instruction value and the current or voltage fed back therefrom has been known. Therefore, also in the waveform display technique in the embodiment, the waveform may be displayed in consideration of the temporal difference Which has been used in the normal arc-tracking. Even in an apparatus which does not perform arc-tracking, the temporal difference may be calculated in advance by similar experiments.

EXAMPLES

Some waveforms displayed by the aforementioned technique is described below as Examples.

Figure 2A:
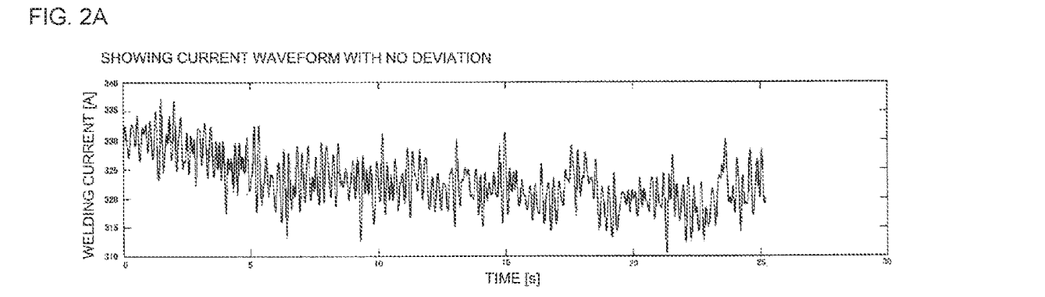
FIG. 2A is a graph showing a current waveform during welding (with a deviation of 0 mm).
Figure 2B:
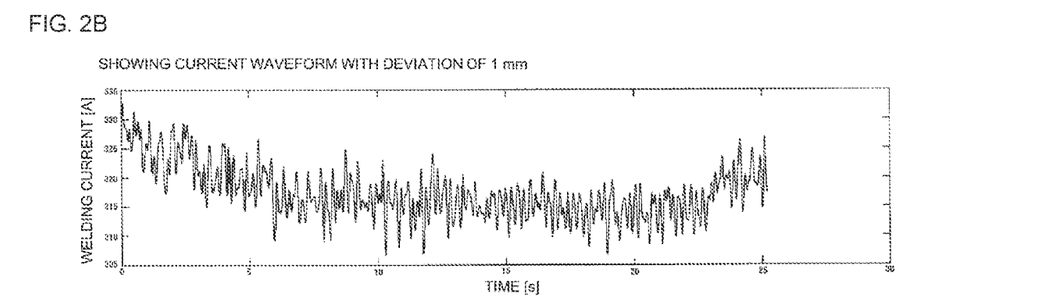
FIG. 2B is a graph showing a current waveform during welding (with a deviation of 1 mm).
Figure 2C:
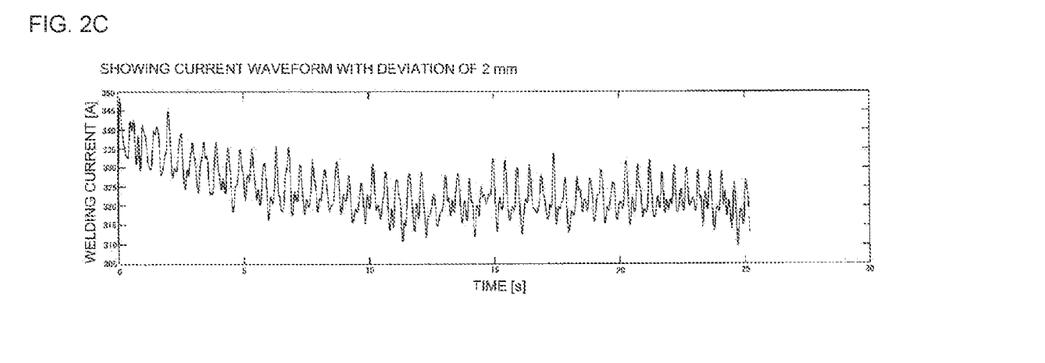
FIG. 2C is a graph showing a current waveform during welding (with a deviation of 2 mm).

FIG. 2A to FIG. 2C relate to the background-art display technique, showing current waveforms in arc-tracking welding. The display time of each waveform has a range of from 0 second to 25 seconds. When the waveform for such a long time is displayed, it is difficult for a worker to recognize a deviation in arc-tracking even if the deviation occurs therein. That is, each waveform shown in FIG. 2A to FIG. 2C is a waveform from which high frequency noise has been eliminated. However, only when the waveform is simply plotted on the screen, the worker hardly understands the waveform because the current waveform itself is distorted due to influence of weaving or an arc welding phenomenon.

Accordingly, at least one of a welding current or a welding voltage during arc-tracking welding is displayed on a screen with a range sectioned by each fixed period including at least one weaving period, and presented to a worker (welding operator).

Figure 3A:
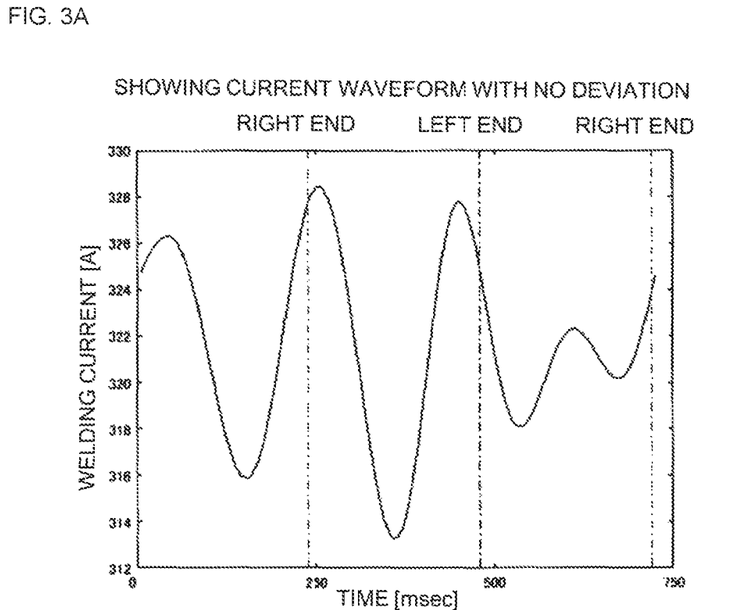
FIG. 3A is a graph showing a current waveform for a fixed period including at least one weaving period (with a deviation of 0 mm).
Figure 3B:
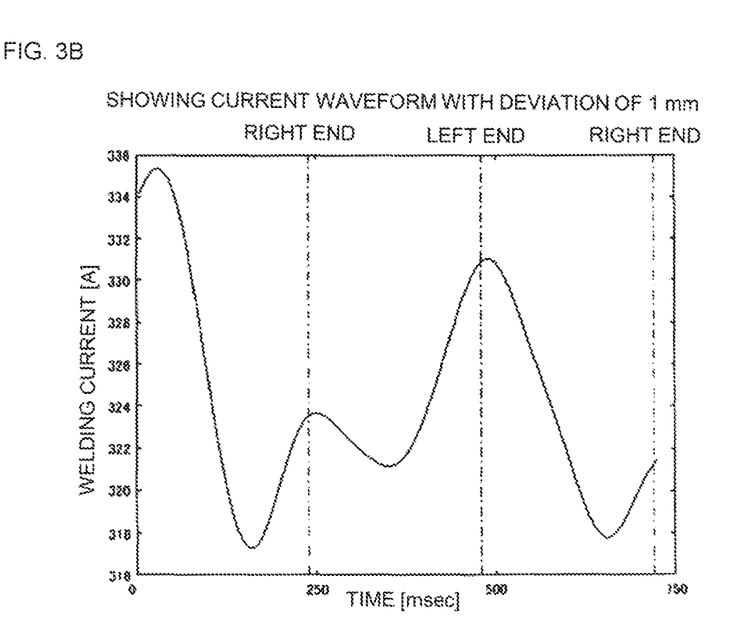
FIG. 3B is a graph showing a current waveform for a fixed period including at least one weaving period (with a deviation of 1 mm).
Figure 3C:
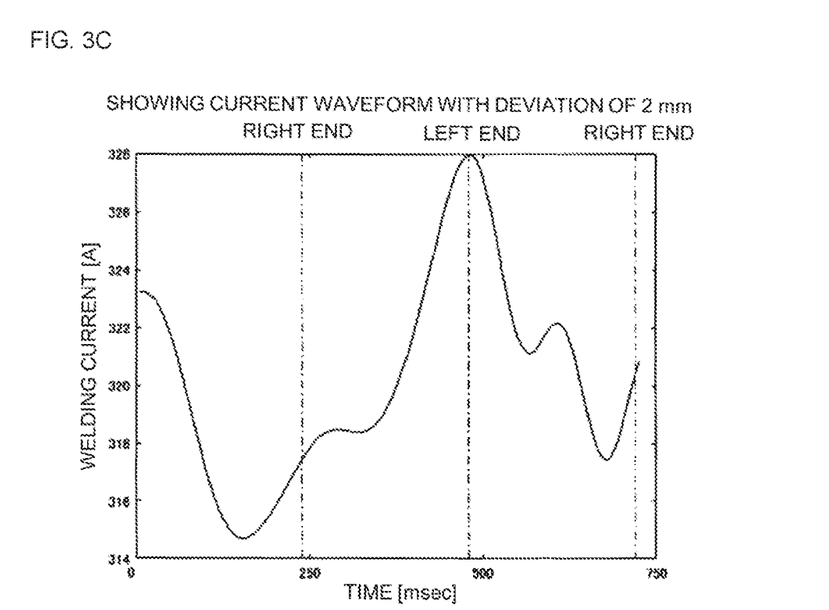
FIG. 3C is a graph showing a current waveform for a fixed period including at least one weaving period (with a deviation of 2 mm).

Each of FIG. 3A to FIG. 3C shows a variation of a welding current for a time slightly exceeding one period. That is, one weaving period between the time point when the welding torch 5 reaches the right end and the time point when the welding torch 5 reaches the right end again is displayed together with parts before and after the weaving period.

In FIG. 3A to FIG. 3C, weaving is performed in a period of 480 msec. The distance between the right end and the left end is 240 msec.

FIG. 3A shows a current waveform with no deviation. As is apparent from FIG. 3A, it can be instantaneously grasped that the maximum current value at the right end is substantially equal to the maximum current value at the left end. Thus, it can be confirmed that arc-tracking is performed normally.

On the other hand, each of FIG. 3B and FIG. 3C shows a case where a deviation from an expected tracking line occurs. As is apparent from FIG. 3B or FIG. 3C, it can be instantaneously grasped that there is a large difference between the maximum current value at the right end and the maximum current value at the left end, and abnormality occurs in arc tracking.

When the display time is increased by about half the weaving period, the waveform can be displayed to be easy to see. That is, when the waveform is displayed for a time corresponding to about 1.5 weaving periods, the right end and the left end can be displayed sufficiently including behaviors before and after the right end and the left end. Therefore, it is easy for the worker to see the waveform.

Figure 3D:
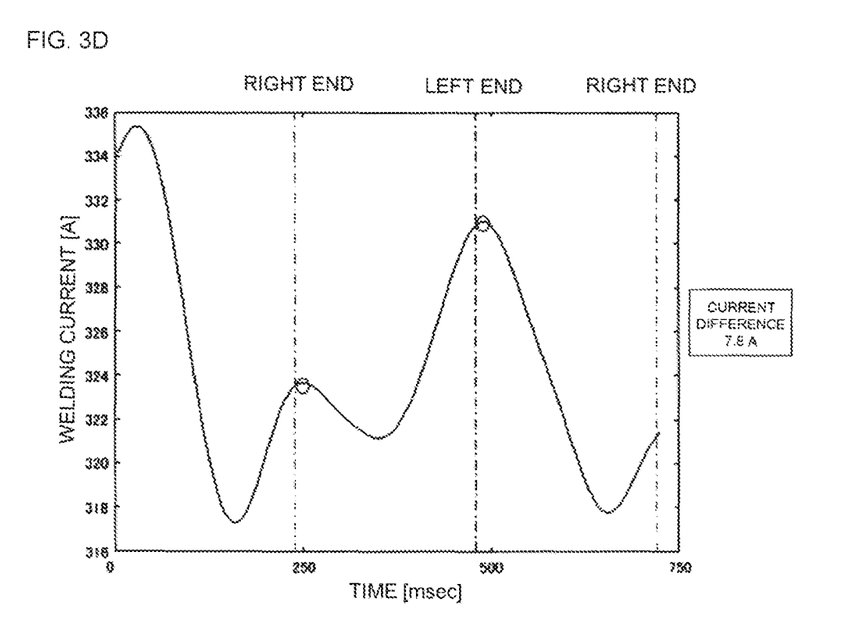
FIG. 3D is a graph showing a current waveform for a fixed period including at least one weaving period (with a deviation of 2 mm, emphasized points being used in detection logic of a difference between left and right currents in tracking).

Further, when points used in detection logic of a difference between left and right currents in arc-tracking are surrounded and emphasized by circles or the like as shown in the display manner (iv), the maximum current value at the right end and the maximum current value at the left end can be grasped more easily (see FIG. 3D). Further, it is very preferable to display the current difference (difference between the maximum current value at the right end and the maximum current value) numerically.

Figure 4A:
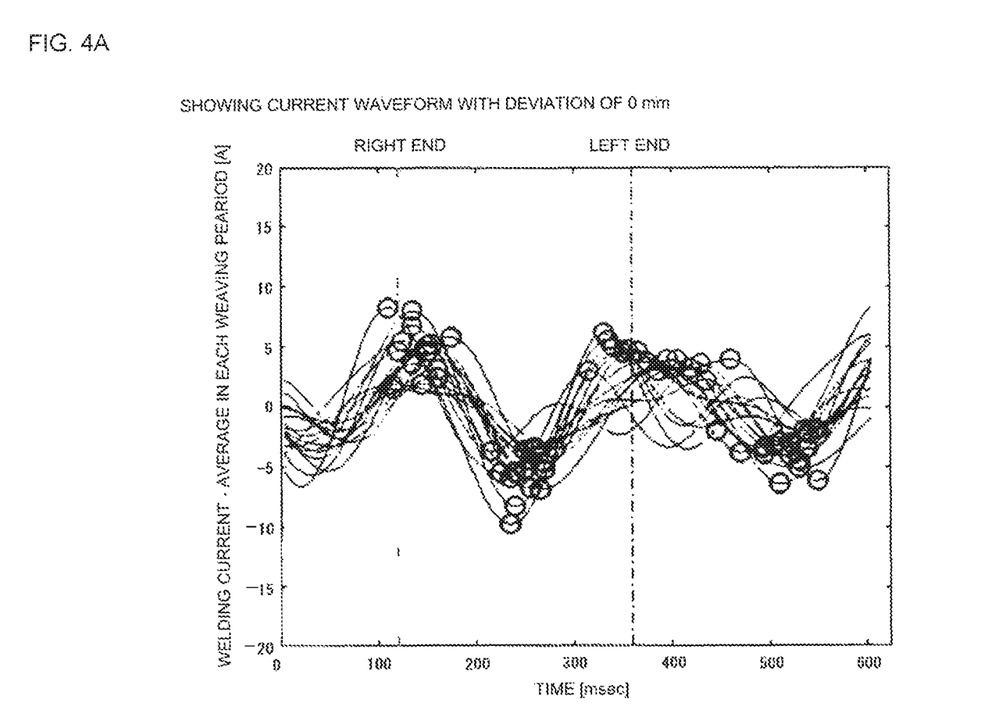
FIG. 4A is a graph showing a result of subtracting an average current in each weaving from a current waveform for a fixed period including at least one weaving period (with a deviation of 0 mm).

In addition, a waveform in which an average current for each weaving period is subtracted from a current waveform sectioned by the weaving period or such waveforms superimposed on one another may be displayed as shown in the display manner (ii) or (iii) (see FIG. 4A to FIG. 4C), FIG. 4A shows a current waveform with no deviation. It can be instantaneously grasped that the maximum current value at the right end is substantially equal to the maximum current value at the left end. It is understood that when an average current for each weaving period is subtracted from a current waveform and such waveforms for several periods are superimposed on one another, the balance between the left and right currents can be observed extremely well. Due to the superimposed waveforms, comprehensive observation can be attained without depending on unevenness in each period.

Figure 4B:
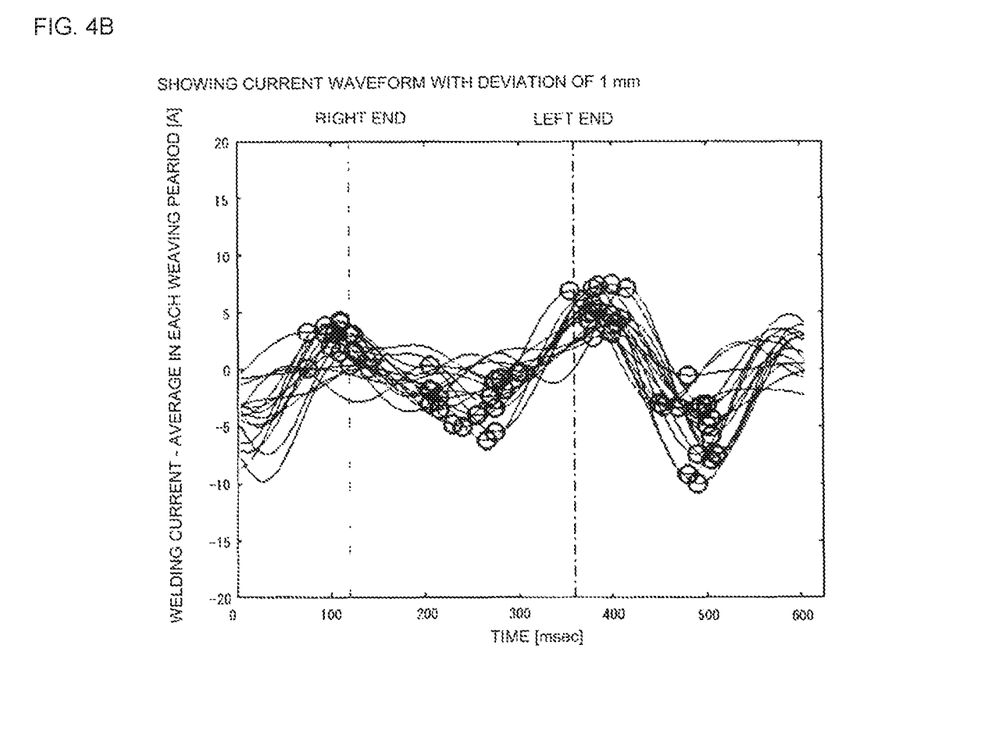
FIG. 4B is a graph showing a result of subtracting an average current in each weaving from a current waveform for a fixed period including at least one weaving period (with a deviation of 1 min).
Figure 4C:
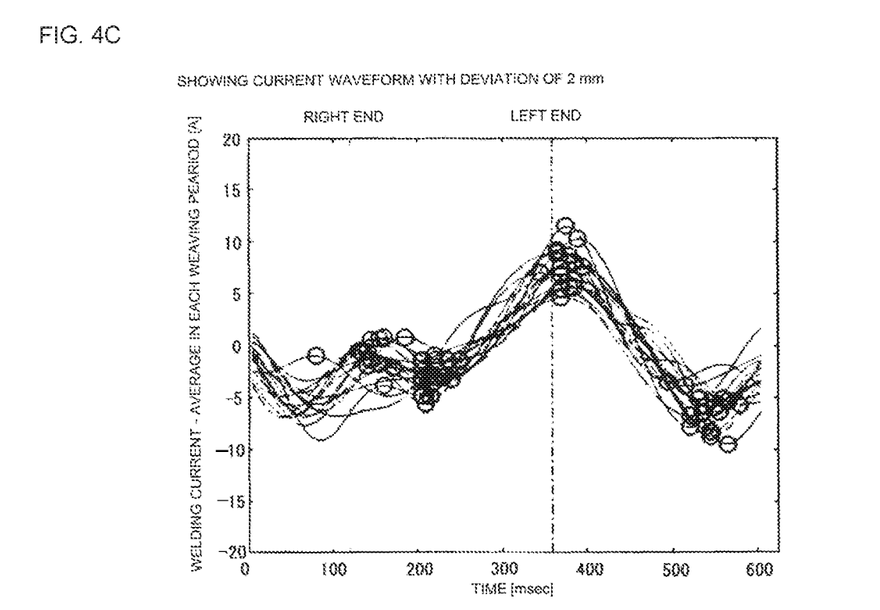
FIG. 4C is a graph showing a result of subtracting an average current in each weaving from a current waveform for a fixed period including at least one weaving period (with a deviation of 2 mm).

On the other hand, FIG. 4B or FIG. 4C shows a current waveform with a deviation. When an average current for each weaving period is subtracted from a current waveform and such waveforms for several periods are superimposed on one another, the difference between the maximum current value at the right end and the maximum current value at the left end appears conspicuously.

As described above, when the arc welding display device and the arc welding display method according to the invention are used, the worker who performs arc-tracking welding can observe the displayed screen and perform working efficiently to determine welding conditions and tracking parameters. Thus, the arc-tracking welding can be performed accurately even in an actual welding site while the working time or the number of trials can be reduced.

The embodiment disclosed herein should be considered not as restrictive but as exemplary in any respect. Particularly, values which are not out of ranges normally used by those skilled in the art but can be estimated easily by those skilled in the art are used as items which have not been suggested clearly in the embodiment disclosed herein, such as running conditions or operating conditions, various parameters, dimensions, weights and volumes of constituents, etc.

The present application is based on Japanese Patent Application No. 2016-220666 filed on Nov. 11, 2016, the disclosure of which is incorporated herein by reference.

DESCRIPTION OF REFERENCE NUMERALS AND SIGNS 1 welding robot (welding apparatus)
2 teaching pendant
3 control device
4 base material
5 welding torch
6 welding wire
7 welding power source
8 display device

The invention claimed is:

1. An arc welding display device included in a welding apparatus having a weaving function of swinging a torch with respect to a welding direction, which displays, on a screen, at least one of a welding current and a welding voltage during the arc welding with a range sectioned by each fixed period including at least one weaving period,
wherein an average welding current in each fixed period including at least one weaving period is subtracted from the welding current during the arc welding or an average welding voltage in each fixed period including at least one weaving period is subtracted from the welding voltage during the arc welding, and a value acquired by the subtraction is displayed on the screen.

2. The arc welding display device according to claim 1, wherein as for the welding current or the welding voltage during the arc welding, waveforms in several periods which are superimposed on one another, each of which is a waveform sectioned by each fixed period including at least the one weaving period, are displayed on the screen.

3. The arc welding display device according to claim 2, which displays, as for the welding current or the welding voltage during the arc welding, an indication indicating a position corresponding to a left end or a right end of a weaving operation on the screen.

4. The arc welding display device according to claim 1, which displays, as for the welding current or the welding voltage during the arc welding, an indication indicating a position corresponding to a left end or a right end of a weaving operation on the screen.

5. The arc welding display device according to claim 1, which displays information required for the arc welding on the screen.

6. An arc welding display method for displaying a state of arc welding in a welding apparatus having a weaving function of swinging a torch with respect to a welding direction, the method comprising displaying at least one of a welding current and a welding voltage during the arc welding with a range sectioned by each fixed period including at least one weaving period, wherein an average welding current in each fixed period including at least the one weaving period is subtracted from the welding current during the arc welding or an average welding voltage in each fixed period including at least one weaving period is subtracted from the welding voltage during the arc welding, and a value acquired by the subtraction is displayed.

7. The arc welding display method according to claim 6, wherein as for the welding current or the welding voltage during the arc welding, waveforms in several periods which are superimposed on one another, each of which is a waveform sectioned by each fixed period including at least the one weaving period, are displayed.

8. The arc welding display method according to claim 7, comprising, as for the welding current or the welding voltage during the arc welding, displaying an indication indicating a position corresponding to a left end or a right end of a weaving operation.

9. The arc welding display method according to claim 6, comprising, as for the welding current or the welding voltage during the arc welding, displaying an indication indicating a position corresponding to a left end or a right end of a weaving operation.

10. The arc welding display method according to claim 6, comprising displaying information required for the arc welding.

* * * * *